Patented Mar. 16, 1937

2,073,734

UNITED STATES PATENT OFFICE 2,073,734

ELECTRICAL STORAGE CELL

Jeremiah Alphonsus Downing, Cork, Irish Free State, assignor to D. & B. Electrical Company Limited, London, England No Drawing. Application February 7, 1933, Serial No. 655,681. In Great Britain February 8, 1932

1 Claim. (Cl. 136—165)

This invention relates to electrical storage cells and more particularly to the treatment of the positive plates of such cells.

According to the invention the positive plates of an existing lead acid cell are treated with oxalic acid after the cell has been discharged and emptied and before it is refilled with liquid. In some cases, a small quantity of pyrogallic acid is subsequently added to the cell.

By way of example of the quantities of the acids to be used and of the manner in which they should be introduced into the cell, I shall now describe the method which I have found most satisfactory in treating the positive plates of an existing lead-sulphuric acid cell having plates some four inches by five and a fluid capacity of some one and a half pints.

The cell is allowed to discharge until its electromotive force is reduced well below its working capacity, and the sulphuric acid electrolyte is then emptied out. Two ounces of a solution obtained by dissolving two ounces of oxalic acid in one pint of water are then introduced into the positive plates, suitably by spraying, the solution being distributed as evenly as possible over the plates. After an interval of fifteen or twenty seconds—which period varies in accordance with the plate action—when the plates are acting freely, half an ounce of sulphuric acid solution of specific gravity 1.25 is similarly introduced into the plates. After a further interval of fifteen or twenty seconds the cell is filled with distilled water and three or four minims of a solution obtained by dissolving one ounce of pyrogallic acid in one pint of water are added. The cell is then allowed to stand until all motion in the electrolyte has ceased, a period which is usually about four hours. It will be appreciated that the electrolyte is formed by the solution in the distilled water of the sulphuric acid sprayed into the positive plates of the cell and of the residual acid left on the plates, separators and walls of the cell when the cell was emptied out. In certain cases, particularly with large cells having no separators, the amount of residual acid is insufficient to form a satisfactory electrolyte and in such cases it is advantageous to replace the distilled water by a dilute solution of sulphuric acid; the final specific gravity of the electrolyte should not exceed 1.15.

It will be noted that in carrying out my invention oxalic acid is used for treating the positive plates of an existing lead-acid cell after the latter has been discharged and emptied and not in the initial manufacture of the plates nor merely as a constituent of the electrolyte.

Moreover, it will be observed that my process is purely chemical in its action, the oxalic acid reacting with the paste of the plate to effect its chemical decomposition with the evolution of carbon dioxide gas.

What I claim and desire to secure by Letters Patent is:—

A method of treating the positive lead peroxide pasted plates of lead acid cells which consists in spraying the plates when in discharged condition with a solution of two ounces of oxalic acid in one pint of water and after an interval when the reaction between the acid solution and the paste of the plates is proceeding applying to the plates a solution of sulphuric acid of 1.25 gravity.

JEREMIAH ALPHONSUS DOWNING.